(12) United States Patent
Goto

(10) Patent No.: US 9,320,000 B2
(45) Date of Patent: Apr. 19, 2016

(54) BASE STATION AND METHOD OF CONTROLLING TRANSMISSION POWER

(71) Applicant: NTT DOCOMO, INC., Chiyoda-ku (JP)

(72) Inventor: Yoshikazu Goto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/405,195

(22) PCT Filed: Jun. 28, 2013

(86) PCT No.: PCT/JP2013/067832
§ 371 (c)(1),
(2) Date: Dec. 3, 2014

(87) PCT Pub. No.: WO2014/034248
PCT Pub. Date: Mar. 6, 2014

(65) Prior Publication Data
US 2015/0156735 A1    Jun. 4, 2015

(30) Foreign Application Priority Data
Aug. 30, 2012  (JP) .................................. 2012-189501

(51) Int. Cl.
*H04B 7/00* (2006.01)
*H04W 52/54* (2009.01)
(Continued)

(52) U.S. Cl.
CPC ............ *H04W 52/54* (2013.01); *H04W 52/146* (2013.01); *H04W 52/221* (2013.01);
(Continued)

(58) Field of Classification Search
CPC . H04W 52/04; H04W 52/146; H04W 52/143; H04W 52/08; H04W 52/22; H04W 72/04; H04W 72/085; H04W 52/0225; H04W 52/10; H04W 72/08; H04W 72/1231

USPC ................ 455/522, 69, 127.1, 509, 507, 561, 455/550.1, 450, 452.1, 412.1, 412.2, 508, 455/514, 515, 500, 517, 426.1, 426.2, 455/422.1, 403, 445; 370/252, 328, 329, 370/318, 310
See application file for complete search history.

(56) References Cited

U.S. PATENT DOCUMENTS

| 6,337,988 B1 | 1/2002 | Agin et al. |
| 2003/0003875 A1 | 1/2003 | Oestreich |

(Continued)

FOREIGN PATENT DOCUMENTS

| JP | 2010-034612 A | 2/2010 |
| JP | 2011-061706 A | 3/2011 |

(Continued)

OTHER PUBLICATIONS

International Search Report issued Sep. 17, 2013 in PCT/JP2013/067832 Filed Jun. 28, 2013.
(Continued)

*Primary Examiner* — Keith Ferguson
(74) *Attorney, Agent, or Firm* — Oblon, McClelland, Maier & Neustadt, L.L.P.

(57) ABSTRACT

A base station in accordance with one embodiment of the present invention includes a cumulative value storage unit configured to store a cumulative value of transmission power control commands transmitted to a mobile station; a transmission power control command determination unit configured to determine a transmission power control command based on the cumulative value stored in the cumulative value storage unit, when uplink transmission power is initialized; and a control channel transmission unit configured to transmit the transmission power control command determined by the transmission power control command determination unit to the mobile station on a control channel.

9 Claims, 10 Drawing Sheets

(51) Int. Cl.
*H04W 52/22* (2009.01)
*H04W 52/14* (2009.01)
*H04W 52/24* (2009.01)
*H04W 52/04* (2009.01)
*H04W 52/36* (2009.01)
*H04W 52/44* (2009.01)

(52) U.S. Cl.
CPC .......... *H04W52/247* (2013.01); *H04W 52/248* (2013.01); *H04W 52/04* (2013.01); *H04W 52/362* (2013.01); *H04W 52/44* (2013.01)

(56) References Cited

U.S. PATENT DOCUMENTS

| | | |
|---|---|---|
| 2010/0142455 A1 | 6/2010 | Imamura |
| 2011/0105200 A1* | 5/2011 | Tomita et al. ..... H04W 52/0241 455/574 |
| 2013/0194987 A1* | 8/2013 | Immonen et al. ... H04W 52/367 370/311 |

FOREIGN PATENT DOCUMENTS

| | | |
|---|---|---|
| JP | 2011-130058 A | 6/2011 |
| JP | 2012-005078 A | 1/2012 |
| JP | 2012-511266 A | 5/2012 |
| WO | WO 2010/067766 A1 | 6/2010 |

OTHER PUBLICATIONS

"Technical specification group radio access network; Evolved universal terrestrial radio access (E-UTRA); Physical layer procedures (Release 10)", $3^{rd}$ Generation Partnership Project, 3GPP TS 36.213, V10.6.0, 2012, pp. 1-125.

Extended European Search Report mailed Feb. 2, 2016 in European Patent Application No. 13832800.0.

* cited by examiner

FIG.5

| CUMULATIVE VALUE OF TPC COMMANDS IMMEDIATELY BEFORE INITIALIZATION | NUMBER OF SUBFRAMES |
|---|---|
| LARGER THAN 30 | 10 |
| +20 ~ +10 | 5 |
| +10 ~ 0 | 3 |
| 0 ~ −10 | 5 |
| SMALLER THAN −10 | 10 |

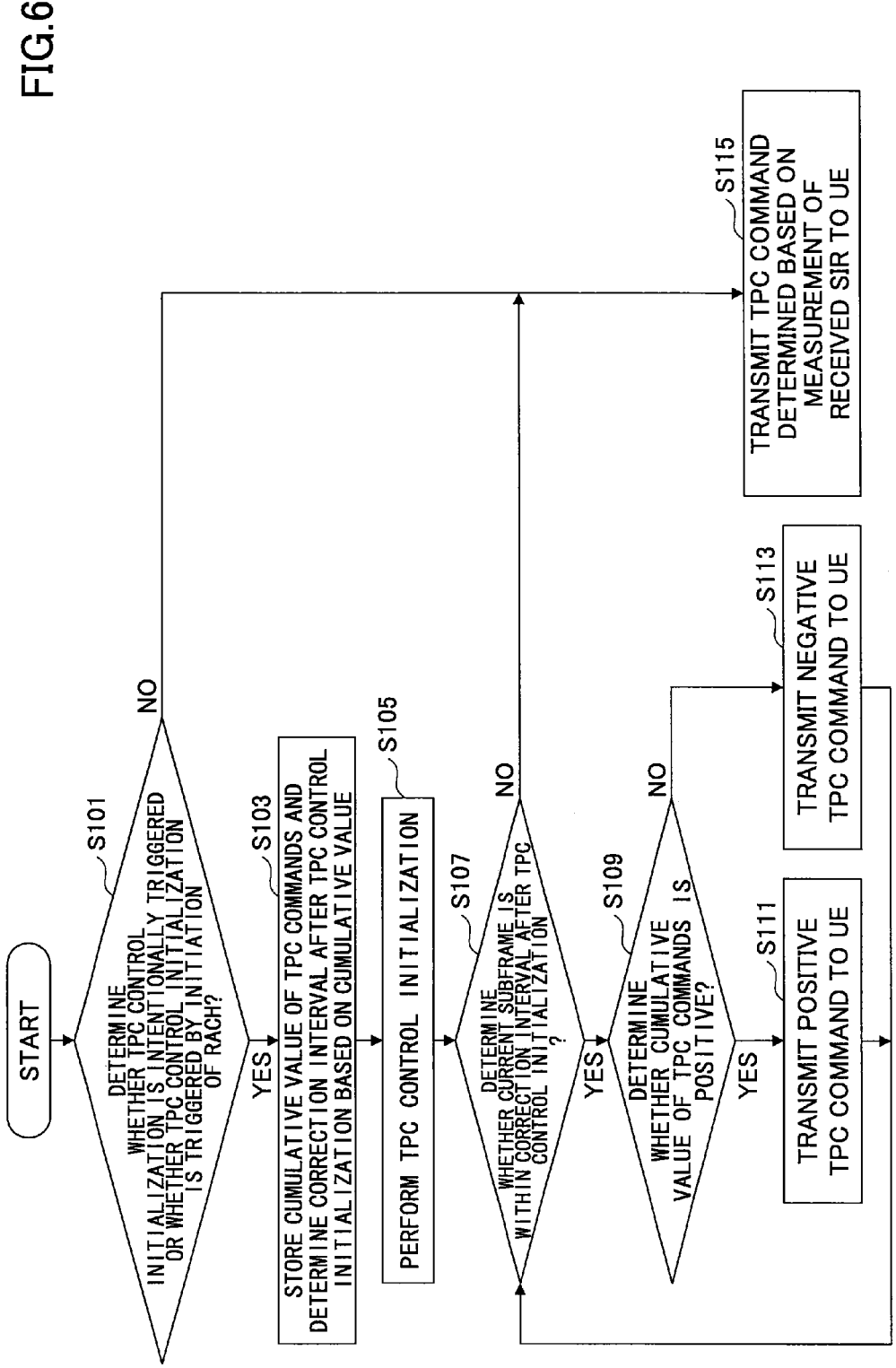

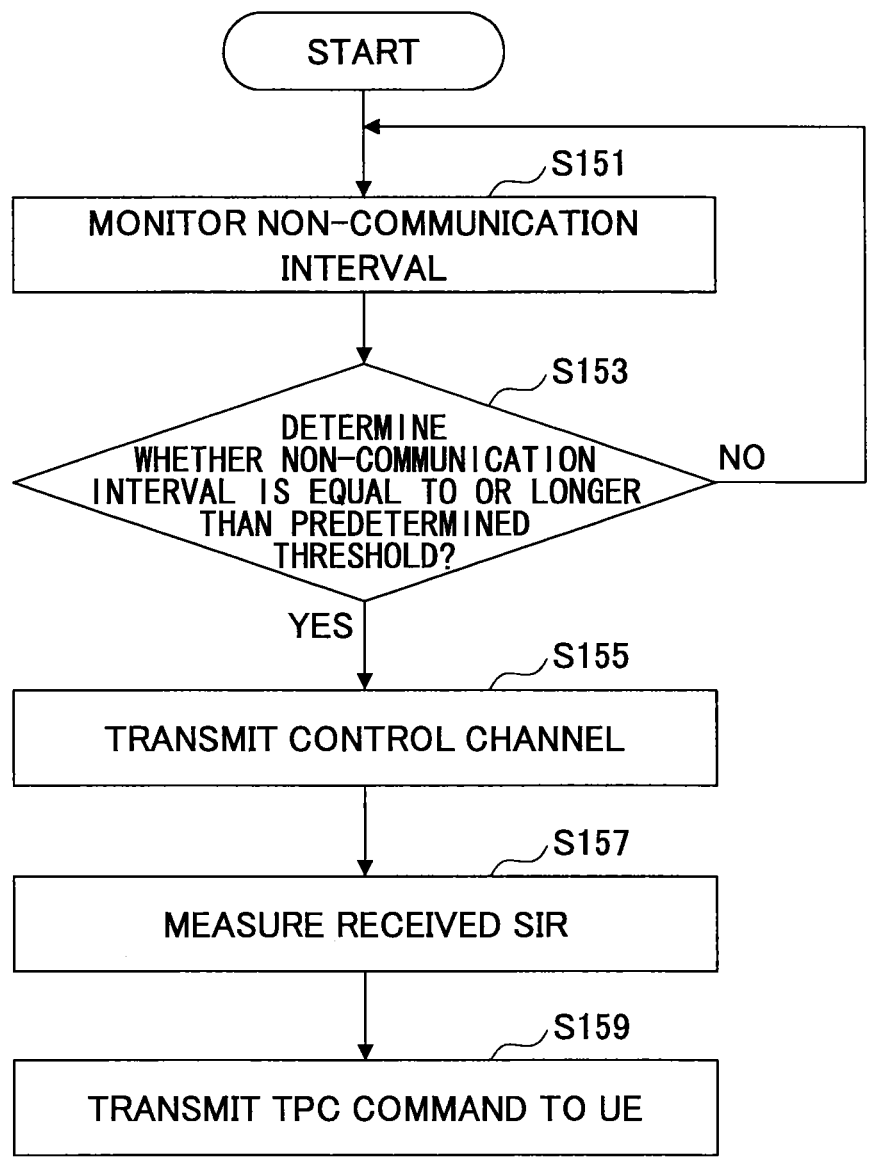

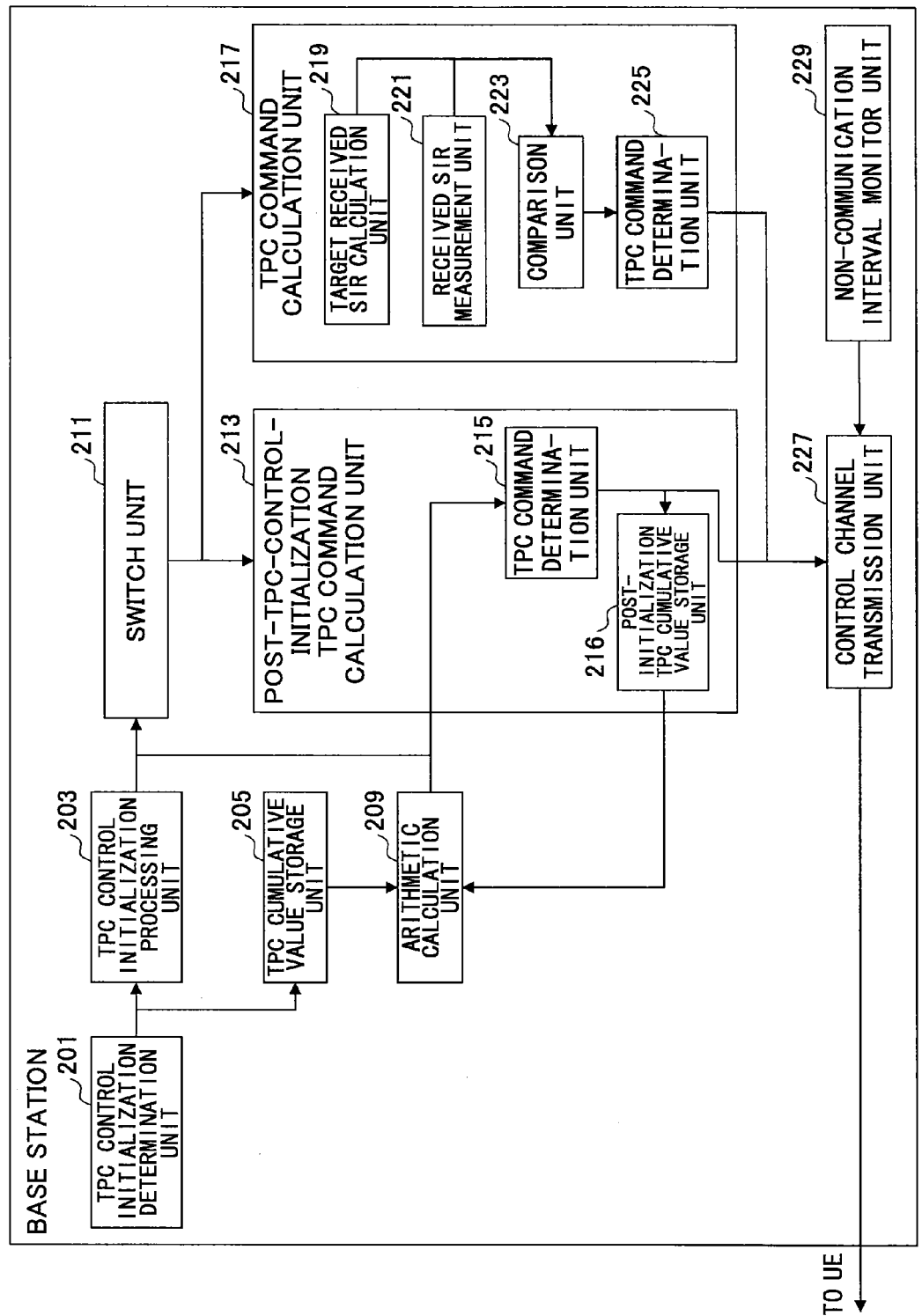

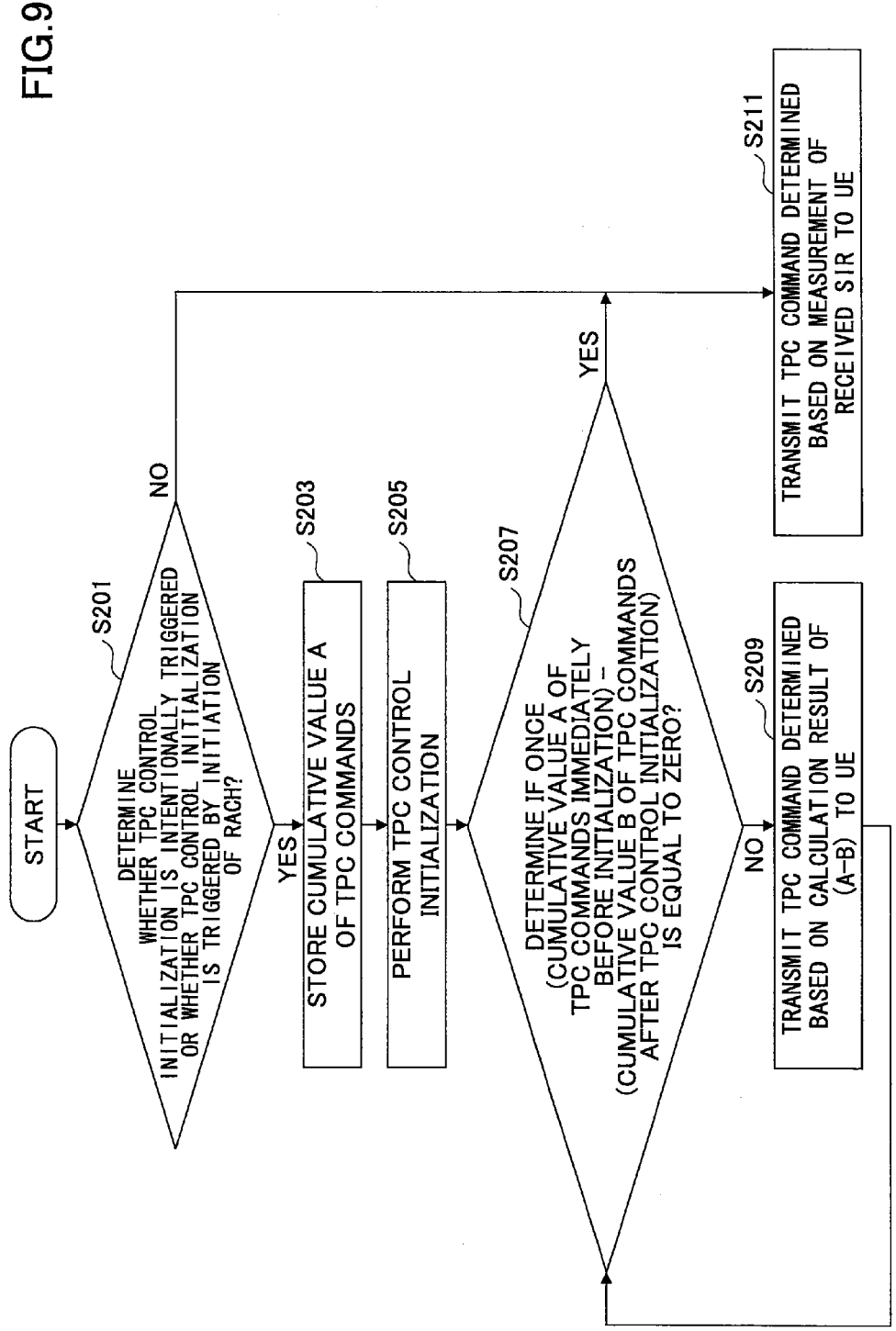

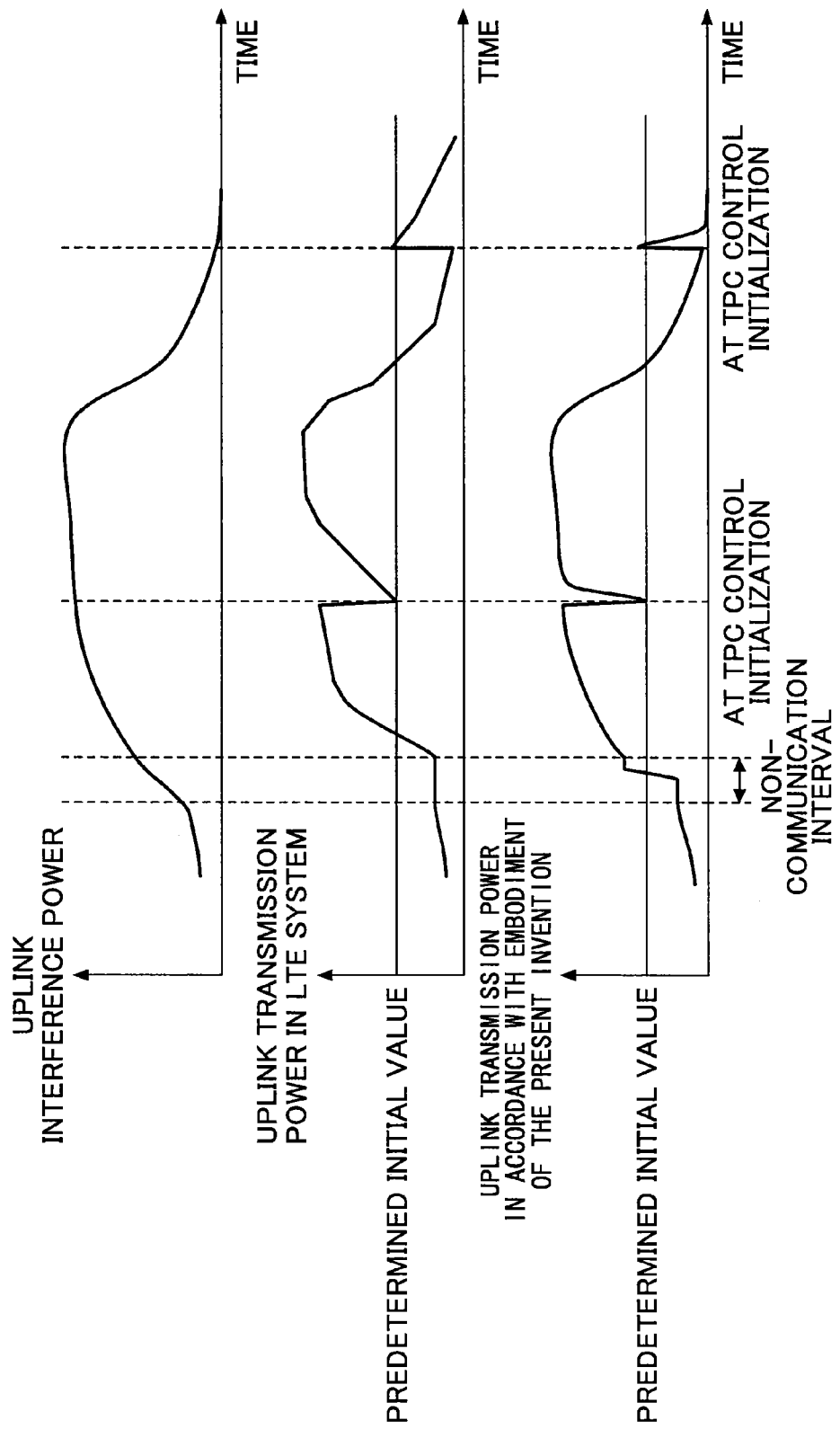

BASE STATION AND METHOD OF CONTROLLING TRANSMISSION POWER

TECHNICAL FIELD

The present invention relates to a base station and a method of controlling transmission power.

BACKGROUND ART

In an LTE (Long Term Evolution) mobile communication system, a mobile station (UE: User Equipment) controls transmission power of a PUSCH (Physical Uplink Shared Channel) or a PUCCH (Physical Uplink Control Channel) according to a TPC (Transmission Power Control) command from a base station (eNB: evolved Node B).

For example, when a base station receives from a mobile station a buffer status report indicating that there are uplink (UL) transmission data to be transmitted from the mobile station, the base station allocates PUSCH transmission to the mobile station by a scheduler and transmits an UL scheduling grant on a PDCCH (Physical Downlink Control Channel). A TPC command for the PUSCH is transmitted along with the UL scheduling grant. A TPC command for the PUSCH is defined in Table 5.1.1.1-2 and Table 5.1.1.1-3 in TS 36.213 (see 3GPP TS 36.213, V10.6.0 (2012-06)).

When the base station has downlink (DL) data to be transmitted to a mobile station, the base station allocates PDSCH (Physical Downlink Shared Channel) transmission to the mobile station by the scheduler and transmits DL scheduling information on the PDCCH. A TPC command for the PUCCH is transmitted along with the DL scheduling information. A TPC command for the PUCCH is defined in Table 5.1.2.1-1 and Table 5.1.2.1-2 in TS 36.213 (see 3GPP TS 36.213, V10.6.0 (2012-06)).

DISCLOSURE OF INVENTION

Problem(s) to be Solved by the Invention

As described above, the TPC command for the PUSCH is transmitted when there are uplink transmission data to be transmitted from the mobile station. Accordingly, when there are no uplink transmission data to be transmitted from the mobile station and thus PUSCH transmission is not allocated to the mobile station, a TPC command for the PUSCH is not transmitted.

Similarly, the TPC command for the PUCCH is transmitted when there are downlink transmission data to be transmitted to the mobile station. Accordingly, when there are no downlink transmission data to be transmitted to the mobile station and thus PDSCH transmission is not allocated to the mobile station, a TPC command for the PUCCH is not transmitted.

When a time period during which there are no uplink transmission data to be transmitted from the mobile station lasts for a while, a TPC command for the PUSCH is not transmitted, which makes it impossible to follow the fluctuation of the propagation condition. Similarly, when a time period during which there are no downlink transmission data to be transmitted to the mobile station lasts for a while, a TPC command for the PUCCH is not transmitted, which makes it impossible to follow the fluctuation of the propagation condition.

For example, when reconfiguration or the like is triggered by an input from an operator in the base station or the like or when a mobile station initiates random access, uplink transmission power is initialized. In this case, uplink transmission power temporarily deviates from the propagation condition significantly. It takes some time to follow the propagation condition, during which communication quality is degraded. When communication quality of the PUSCH is degraded, transmission of control signals (C-plane) may fail or throughput of data (U-plane) may be degraded. When communication quality of the PUCCH is degraded, transmission of control information for the PDSCH (ACK, NACK, CQI (Channel Quality Indicator), RI (Rank Information), or the like) may fail and as a result, throughput may be degraded. For example, when uplink interference power is higher than the initialized uplink transmission power, communication quality is degraded. On the other hand, when uplink interference power is lower than the initialized uplink transmission power, an excessive amount of interference power may be provided at another mobile station.

It is a general object of the present invention to appropriately control uplink transmission power by transmitting a TPC command from a base station, even if there are no uplink transmission data to be transmitted from a mobile station or no downlink transmission data to be transmitted to the mobile station.

Means for Solving the Problem(s)

In one aspect of the present invention, there is provided a base station, including:

a cumulative value storage unit configured to store a cumulative value of transmission power control commands transmitted to a mobile station;

a transmission power control command determination unit configured to determine a transmission power control command based on the cumulative value stored in the cumulative value storage unit, when uplink transmission power is initialized; and a control channel transmission unit configured to transmit the transmission power control command determined by the transmission power control command determination unit to the mobile station on a control channel.

In another aspect of the present invention, there is provided a base station, comprising:

a non-communication interval monitor unit configured to monitor a non-communication interval during which downlink data or uplink data are not transmitted;

a control channel transmission unit configured to transmit control information for causing a mobile station to transmit data or control information, when the non-communication interval monitored by the non-communication interval monitor unit is equal to or longer than a predetermined threshold; and a transmission power control command determination unit configured to determine a transmission power control command based on received quality of data or control information received from the mobile station.

In another aspect of the present invention, there is provided a method of controlling uplink transmission power in a base station, comprising the steps of:

storing a cumulative value of transmission power control commands transmitted to a mobile station;

determining a transmission power control command based on the stored cumulative value, when uplink transmission power is initialized; and transmitting the determined transmission power control command to the mobile station on a control channel.

In another aspect of the present invention, there is provided a method of controlling uplink transmission power in a base station, comprising the steps of:

monitoring a non-communication interval during which downlink data or uplink data are not transmitted;

transmitting control information for causing a mobile station to transmit data or control information, when the monitored non-communication interval is equal to or longer than a predetermined threshold; and determining a transmission power control command based on received quality of data or control information received from the mobile station.

Advantageous Effect of the Invention

According to the present invention, a base station can control uplink transmission power, even if there are no uplink transmission data to be transmitted from a mobile station or no downlink transmission data to be transmitted to the mobile station, thereby improving communication quality.

BRIEF DESCRIPTION OF THE DRAWINGS

FIG. 5 shows an exemplary relationship between a cumulative value of TPC commands and a correction interval during which a TPC command is transmitted.

FIG. 6 shows a flowchart of a method of controlling transmission power in accordance with an embodiment of the present invention (in the case of TPC control initialization).

FIG. 7 shows a flowchart of a method of controlling transmission power in accordance with an embodiment of the present invention (in the case where a non-communication interval is equal to or longer than a predetermined threshold).

FIG. 8 shows a block diagram of a base station in accordance with a modified embodiment of the present invention.

FIG. 9 shows a flowchart of a method of controlling transmission power in accordance with a modified embodiment of the present invention (in the case of TPC control initialization).

FIG. 10 shows a comparison between uplink transmission power in an LTE mobile communication system and uplink transmission power in a mobile station in accordance with an embodiment of the present invention.

DETAILED DESCRIPTION OF THE PREFERRED EMBODIMENTS

An embodiment of the present invention is described below with reference to the accompanying drawings.

In an embodiment of the present invention, a base station stores a cumulative value of TPC commands transmitted to a mobile station. When uplink transmission power is initialized, the base station determines a TPC command based on the stored cumulative value and transmits the determined TPC command to the mobile station on a control channel.

In addition, the base station can monitor a non-communication interval during which downlink data or uplink data are not transmitted and transmit control information for causing a mobile station to transmit data or control information, when the monitored non-communication interval is equal to or longer than a predetermined threshold.

In this manner, when the uplink transmission power is initialized or when the non-communication interval is equal to or longer than the predetermined threshold, the base station transmits a TPC command, even if there are no uplink transmission data to be transmitted from a mobile station or no downlink transmission data to be transmitted to the mobile station.

Figure 1:
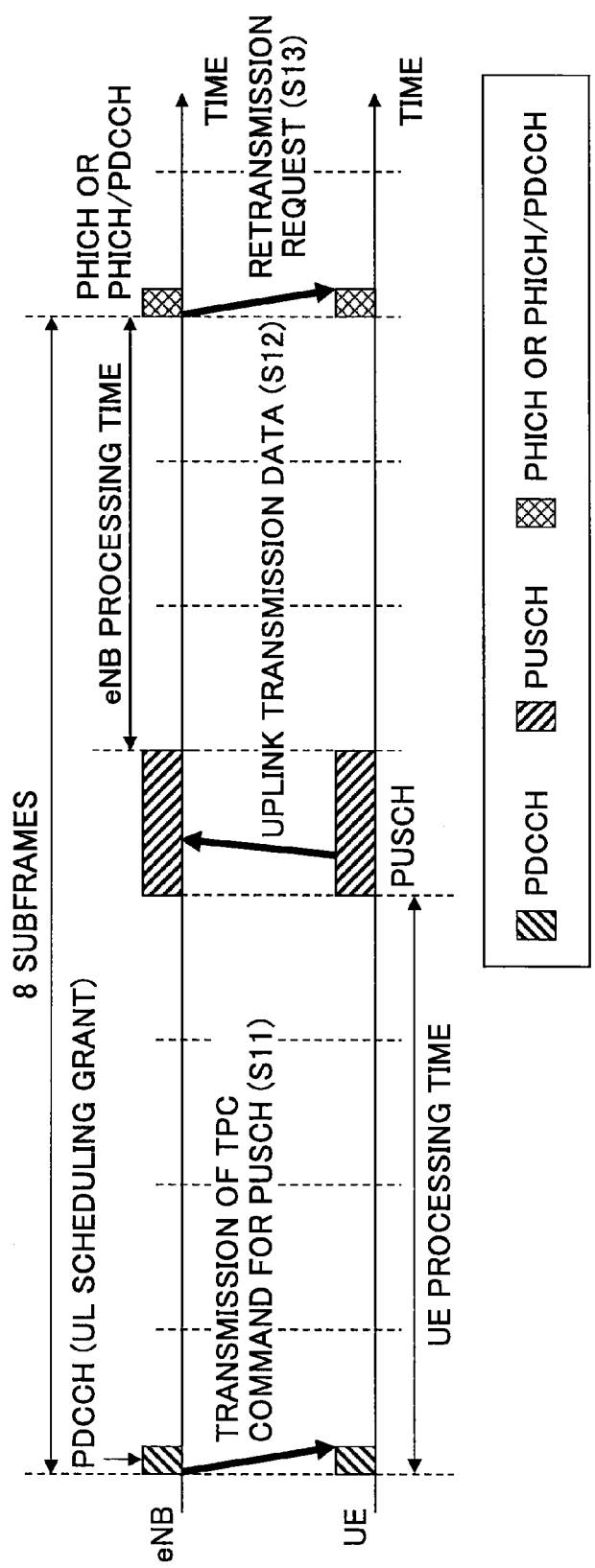
FIG. 1 shows a diagram of transmission power control of a PUSCH in accordance with an embodiment of the present invention.

With reference to FIG. 1, transmission power control of a PUSCH in accordance with an embodiment of the present invention is described below.

In an LTE mobile communication system, for example, when a base station receives from a mobile station a buffer status report indicating that there are uplink transmission data to be transmitted from the mobile station, the base station allocates PUSCH transmission to the mobile station by a scheduler and transmits an UL scheduling grant on a PDCCH. In an embodiment of the present invention, even if there are no uplink transmission data to be transmitted from the mobile station, when uplink transmission power is initialized or when a non-communication interval during which uplink data are not transmitted is equal to or longer than a predetermined threshold, the base station transmits an UL scheduling grant on the PDCCH (S11). A TPC command for the PUSCH may be transmitted along with the UL scheduling grant. The mobile station determines transmission power according to the TPC command and transmits the PUSCH without significant data (without meaningful data) (S12). The PUSCH may include predetermined dummy data. When the base station does not receive the PUSCH, the base station instructs retransmission via a PHICH (Physical Hybrid-ARQ Indicator Channel) or the like (S13).

The TPC command for the PUSCH transmitted in step S11 in FIG. 1 is defined in Table 5.1.1.1-2 and Table 5.1.1.1-3 in TS 36.213. According to the DCI format 0/3, a TPC command can occupy two bits. When a TPC command is 0, an increment or decrement value of transmission power (a value which increases or decreases transmission power) is −1 db. When a TPC command is 1, an increment or decrement value of transmission power is 0 db. When a TPC command is 2, an increment or decrement value of transmission power is 1 db. When a TPC command is 3, an increment or decrement value of transmission power is 3 db. According to the DCI format 3A, a TPC command can occupy one bit. When a TPC command is 0, an increment or decrement value of transmission power is −1 db. When a TPC command is 1, an increment or decrement value of transmission power is 1 db.

Figure 2:
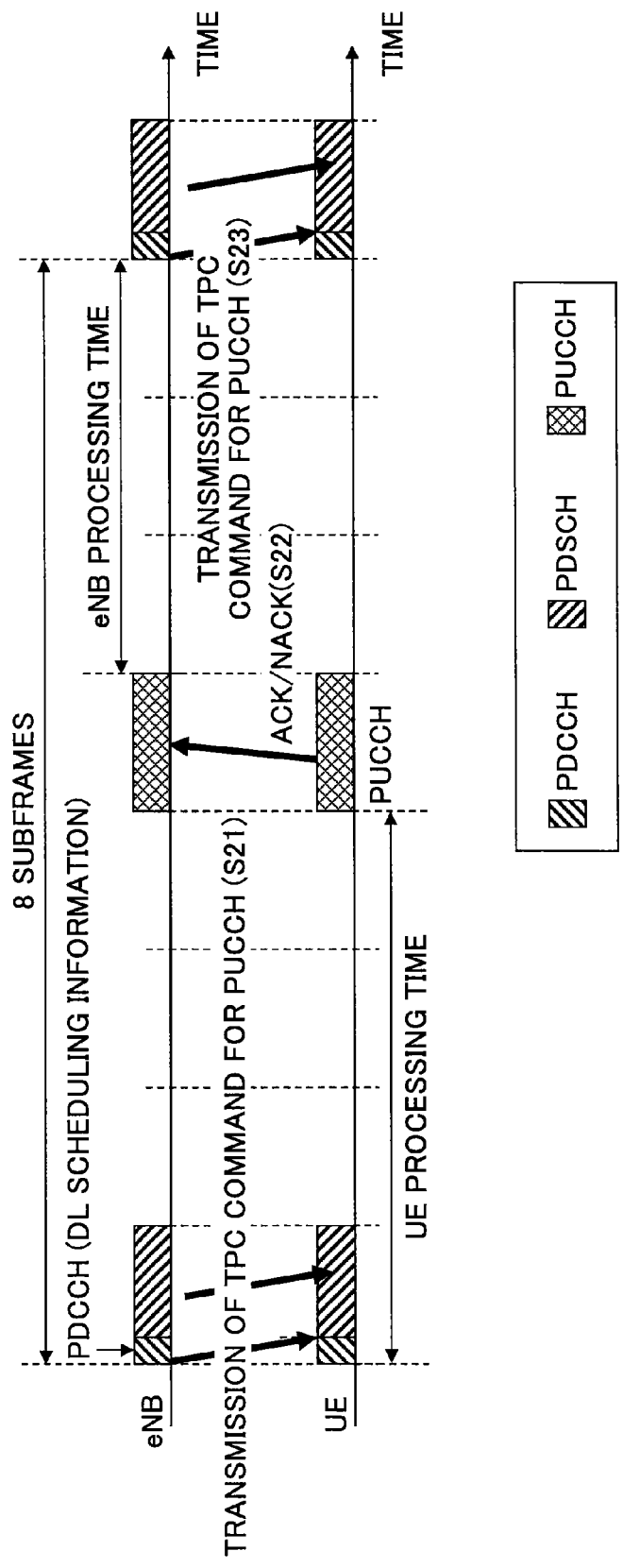
FIG. 2 shows a diagram of transmission power control of a PUCCH in accordance with an embodiment of the present invention.

With reference to FIG. 2, transmission power control of a PUCCH in accordance with an embodiment of the present invention is described below.

In an LTE mobile communication system, when a base station has downlink transmission data to be transmitted to a mobile station, the base station allocates PDSCH transmission to the mobile station by a scheduler and transmits DL scheduling information on the PDCCH. In an embodiment of the present invention, even if there are no downlink transmission data to be transmitted to the mobile station, when uplink transmission power is initialized or when a non-communication interval during which downlink data are not transmitted is equal to or longer than a predetermined threshold, the base station transmits DL scheduling information on the PDCCH (S21). In the same subframe, the base station may also transmit the PDSCH without significant data to the mobile station. The PDSCH may include predetermined dummy data. A TPC command for the PUCCH may be transmitted along with the DL scheduling information. The mobile station transmits control information (ACK/NACK) for the PDSCH on the PUCCH according to the TPC command (S22). The base station further transmits DL scheduling information on the PDCCH, if needed (S23).

The TPC command for the PUCCH transmitted in steps S21 and S23 in FIG. 2 is defined in Table 5.1.2.1-1 and Table 5.1.2.1-2 in TS 36.213. According to the DCI format 1A/1B/1D/1/2A/2B/2/3, a TPC command can occupy two bits. When a TPC command is 0, an increment or decrement value of transmission power is −1 db. When a TPC command is 1, an increment or decrement value of transmission power is 0 db. When a TPC command is 2, an increment or decrement value of transmission power is 1 db. When a TPC command is 3, an increment or decrement value of transmission power is 3 db. According to the DCI format 3A, a TPC command can occupy one bit. When a TPC command is 0, an increment or decrement value of transmission power is −1 db. When a TPC command is 1, an increment or decrement value of transmission power is 1 db.

A configuration and an operation of a base station for transmitting a TPC command when uplink transmission power is initialized or when a non-communication interval is equal to or longer than a predetermined threshold are described in detail below.

Configuration of Base Station

Before describing a base station in accordance with an embodiment of the present invention, uplink transmission power control in an LTE mobile communication system is described below with reference to FIG. 3.

In an LTE mobile communication system, uplink transmission power is controlled according to a TPC command from a base station, as described above. During the period (A), when uplink interference power is high, the base station increases transmission power of a mobile station using a TPC command. During the period (B), it is assumed that there are no uplink transmission data to be transmitted from the mobile station or no downlink transmission data to be transmitted to the mobile station. According to this assumption, a TPC command is not transmitted from the base station, and thus uplink transmission power of the mobile station remains the same. During the period (B), uplink interference power becomes higher. When uplink transmission data to be transmitted from the mobile station or downlink transmission data to be transmitted to the mobile station occur, the base station increases transmission power of the mobile station using a TPC command during the period (C). During the period (D), as mentioned in the period (A), the base station increases transmission power of the mobile station using a TPC command.

At the point (E), uplink transmission power is reset by intentional reconfiguration in the base station or random access in the mobile station. When uplink transmission power is reset while uplink interference power is high, initialized uplink transmission power becomes lower compared to the uplink interference power. Thus, during the period (F), the base station increases transmission power of the mobile station using a TPC command. During the period (G), when the uplink interference is higher, the base station further increases transmission power of the mobile station using a TPC command. On the other hand, during the period (H), when uplink interference power is lower, the base station decreases transmission power of the mobile station using a TPC command. At the point (I), uplink transmission power is reset by intentional reconfiguration in the base station or random access in the mobile station. When uplink transmission power is reset while uplink interference power is low, initialized uplink transmission power becomes higher compared to the uplink interference power. Thus, during the period (J), the base station decreases transmission power of the mobile station using a TPC command.

In the following embodiment of the present invention, a base station is described which can control transmission power of a PUSCH and a PUCCH, when there are no uplink transmission data to be transmitted from a mobile station or no downlink transmission data to be transmitted to a mobile station as shown during the period (B) in FIG. 3, or when uplink transmission power is reset as shown at the point (E) or (I) in FIG. 3.

Figure 4:
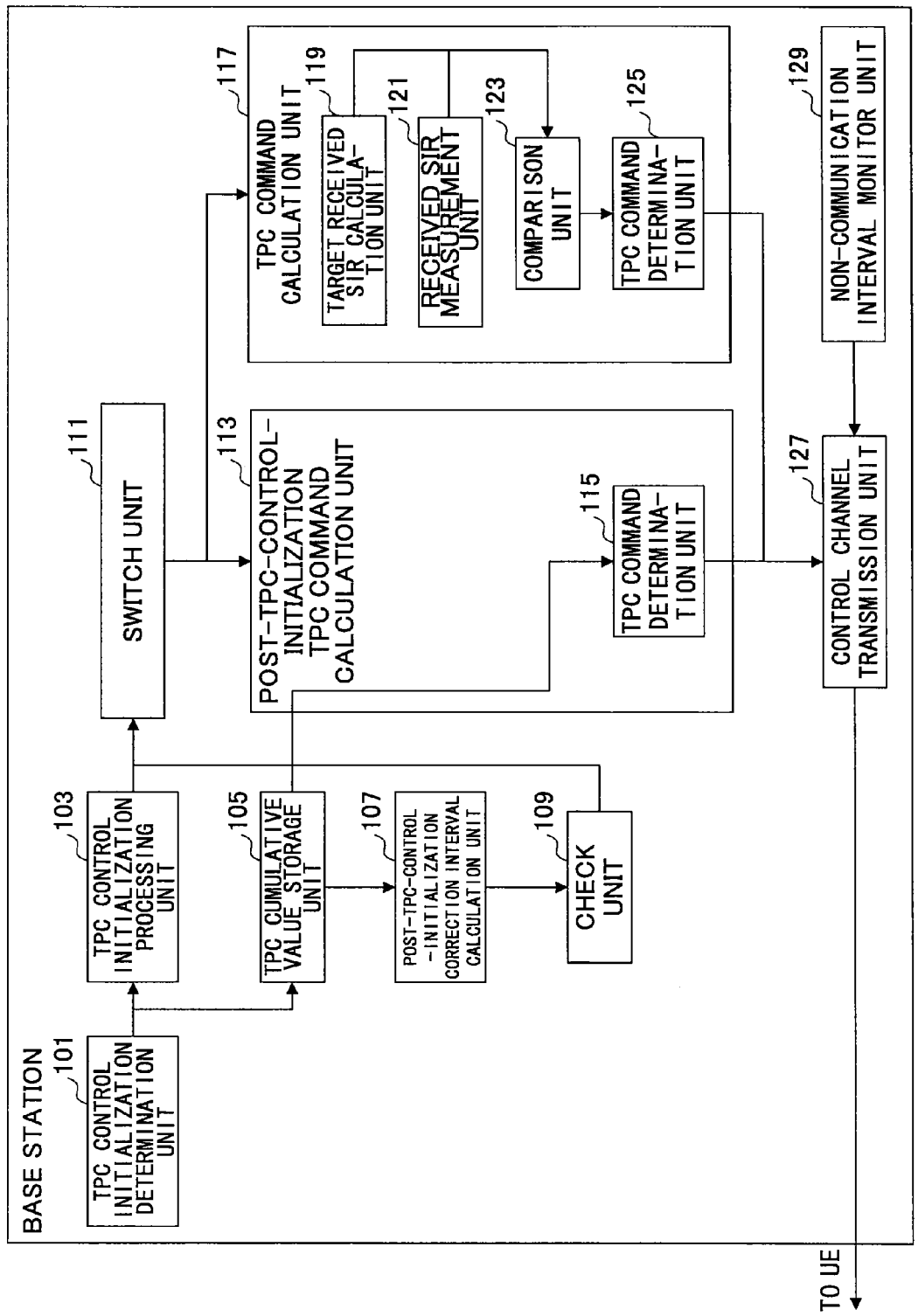
FIG. 4 shows a block diagram of a base station in accordance with an embodiment of the present invention.

FIG. 4 shows a block diagram of a base station in accordance with an embodiment of the present invention. The base station includes a TPC control initialization determination unit 101, a TPC control initialization processing unit 103, a TPC cumulative value storage unit 105, a switch unit 111, a post-TPC-control-initialization TPC command calculation unit 113, a TPC command calculation unit 117, and a control channel transmission unit 127. The base station may further include a post-TPC-control-initialization correction interval calculation unit 107, a check unit 109, and a non-communication interval monitor unit 129.

The TPC control initialization determination unit 101 detects whether reconfiguration is triggered by an input from an operator or the like or whether a mobile station initiates random access, and determines whether to initialize uplink transmission power.

The TPC control initialization processing unit 103 sets uplink transmission power to a predetermined initial value, when the TPC control initialization determination unit 101 determines that uplink transmission power is to be initialized. The initialization of uplink transmission power is hereinafter referred to as "TPC control initialization".

The TPC cumulative value storage unit 105 stores a cumulative value of TPC commands transmitted to a mobile station. For example, the TPC cumulative value storage unit 105 may store an increment or decrement value (−1 dB to 3 dB) of transmission power transmitted to the mobile station with the DCI format 0/3 or the DCI format 1A/1B/1D/1/2A/2B/2/3, or store an increment or decrement value (−1 dB or 1 dB) of transmission power transmitted to the mobile station with the DCI format 3A.

The post-TPC-control-initialization correction interval calculation unit 107 calculates an interval during which a TPC command is transmitted based on the cumulative value stored in the TPC cumulative value storage unit 105. The interval during which a TPC command is continuously or frequently transmitted to a mobile station when uplink transmission power is initialized is hereinafter referred to as a "correction interval". The term "continuously" means "in continuous subframes", for example. The term "frequently" means "in continuous subframes as long as there are available radio resources", for example.

For example, the post-TPC-control-initialization correction interval calculation unit 107 may treat an interval predetermined based on the cumulative value stored in the TPC cumulative value storage unit 105 as the correction interval during which a TPC command is transmitted. FIG. 5 shows an exemplary relationship between a cumulative value of TPC commands and a correction interval during which a TPC command is transmitted. For example, when a cumulative value of TPC commands is smaller than −10, a correction interval during which a TPC command is transmitted may be ten subframes. When a cumulative value of TPC commands is between 0 and −10, a correction interval during which a TPC command is transmitted may be five subframes. When a cumulative value of TPC commands is between +10 and 0, a correction interval during which a TPC command is transmitted may be three subframes. When a cumulative value of TPC commands is between +20 and +10, a correction interval during which a TPC command is transmitted may be five subframes. When a cumulative value of TPC commands is larger than +30, a correction interval during which a TPC command is transmitted may be ten subframes.

For example, when the cumulative value stored in the TPC cumulative value storage unit 105 is positive upon the determination of initialization of uplink transmission power, a TPC command with 3 dB may be used in the DCI format 0/3 or the DCI format 1A/1B/1D/1/2A/2B/2/3 in order to follow the propagation condition as soon as possible. In this case, the post-TPC-control-initialization correction interval calculation unit 107 may calculate the correction interval during which a TPC command is transmitted by dividing the cumulative value stored in the TPC cumulative value storage unit 105 by three. Alternatively, a TPC command with 1 dB may be used in the DCI format 3A. In this case, the post-TPC-control-initialization correction interval calculation unit 107 may treat, as the correction interval during which a TPC command is transmitted, the same number of subframes as the cumulative value stored in the TPC cumulative value storage unit 105. For example, when the cumulative value stored in the TPC cumulative value storage unit 105 is negative upon the determination of initialization of uplink transmission power, a TPC command with −1 dB may be used in the DCI format 0/3, the DCI format 1A/1B/1D/1/2A/2B/2/3, or the DCI format 3A. In this case, the post-TPC-control-initialization correction interval calculation unit 107 may treat, as the correction interval during which a TPC command is transmitted, the same number of subframes as the cumulative value stored in the TPC cumulative value storage unit 105. Alternatively, the post-TPC-control-initialization correction interval calculation unit 107 may multiply the interval calculated as described above by any coefficient or add the interval calculated as described above to any coefficient to determine the correction interval during which a TPC command is transmitted.

The check unit 109 checks whether the current subframe is within the correction interval calculated by the post-TPC-control-initialization correction interval calculation unit 107.

The switch unit 111 determines whether the post-TPC-control-initialization TPC command calculation unit 113 or the TPC command calculation unit 117 is used to determine a TPC command. When the current subframe is within the correction interval calculated by the post-TPC-control-initialization correction interval calculation unit 107, the switch unit 111 uses the post-TPC-control-initialization TPC command calculation unit 113 to continuously or frequently transmit a TPC command to the mobile station. When the current subframe is not within the correction interval calculated by the post-TPC-control-initialization correction interval calculation unit 107, the switch unit 111 uses the TPC command calculation unit 117 to determine a TPC command based on received quality of the PUSCH or the PUCCH as usual.

The post-TPC-control-initialization TPC command calculation unit 113 calculates a value of a TPC command within the correction interval calculated by the post-TPC-control-initialization correction interval calculation unit 107. The post-TPC-control-initialization TPC command calculation unit 113 includes a TPC command determination unit 115.

The TPC command determination unit 115 determines a TPC command based on the cumulative value stored in the TPC cumulative value storage unit 105 when uplink transmission power is initialized. When the cumulative value stored in the TPC cumulative value storage unit 105 is positive, the TPC command determination unit 115 may determine, as a value of the TPC command, a value which increments transmission power at maximum. For example, the TPC command determination unit 115 may determine a TPC command with 3 dB in the DCI format 0/3 or the DCI format 1A/1B/1D/1/2A/2B/2/3, or determine a TPC command with 1 dB in the DCI format 3A, as described above. When the cumulative value stored in the TPC cumulative value storage unit 105 is negative, the TPC command determination unit 115 may determine, as a value of the TPC command, a value which decrements transmission power at maximum. For example, the TPC command determination unit 115 may determine a TPC command with −1 dB in the DCI format 0/3, the DCI format 1A/1B/1D/1/2A/2B/2/3, or the DCI format 3A, as described above.

The TPC command calculation unit 117 calculates a value of a TPC command except during the correction interval calculated by the post-TPC-control-initialization correction interval calculation unit 107. The TPC command calculation unit 117 includes a target received SIR calculation unit 119, a received SIR measurement unit 121, a comparison unit 123, and a TPC command determination unit 125.

The target received SIR calculation unit 119 calculates target received quality based on an error rate of received signals or the like. The target received quality is also referred to as "TargetSIR (Target Signal to Interference Ratio)".

The received SIR measurement unit 121 measures received quality of the PUSCH or the PUCCH. The received quality is also referred to as "received SIR" and determined based on signal power to interference power.

The comparison unit 123 compares the target received quality calculated by the target received SIR calculation unit 119 and the received quality measured by the received SIR measurement unit 121.

The TPC command determination unit 125 determines a TPC command based on the comparison result by the comparison unit 123. For example, when the received quality measured by the received SIR measurement unit 121 is lower than the target received quality calculated by the target received SIR calculation unit 119, the TPC command determination unit 125 determines a TPC command for increasing transmission power. For example, when the received quality measured by the received SIR measurement unit 121 is higher than the target received quality calculated by the target received SIR calculation unit 119, the TPC command determination unit 125 determines a TPC command for decreasing transmission power.

The control channel transmission unit 127 transmits the TPC command determined by the post-TPC-control-initialization TPC command calculation unit 113 or the TPC command calculation unit 117 to the mobile station on a control channel. The TPC command is transmitted with DCI (Downlink Control Information) on the PDCCH. More specifically, the TPC command for the PUSCH is transmitted with an UL scheduling grant and the TPC command for the PUCCH is transmitted with DL scheduling information.

The non-communication interval monitor unit 129 monitors a non-communication interval during which downlink data or uplink data are not transmitted. For example, the non-communication interval monitor unit 129 may monitor a time elapsed from the previous PUSCH transmission or a time elapsed from the previous PDCCH transmission. When the non-communication interval of the PUSCH is equal to or longer than a predetermined threshold, the control channel transmission unit 127 transmits control information (UL scheduling grant) for causing the mobile station to transmit uplink data. When the non-communication interval of the PDCCH is equal to or longer than a predetermined threshold, the control channel transmission unit 127 transmits control information (DL scheduling information) for causing the mobile station to transmit control information.

Operation of Base Station

FIG. 6 shows a flowchart of a method of controlling transmission power in accordance with an embodiment of the present invention (in the case of TPC control initialization).

The TPC control initialization determination unit 101 detects whether TPC control initialization is intentionally trigged under the sequence of reconfiguration or the like in the base station. Alternatively, the TPC control initialization determination unit 101 detects whether TPC control initialization is triggered by initiation of random access in the mobile station (S101).

When the TPC control initialization is triggered (S101: YES), the TPC cumulative value storage unit 105 stores a cumulative value of TPC commands transmitted to the mobile station, and the post-TPC-control-initialization correction interval calculation unit 107 calculates a correction interval during which a TPC command is transmitted based on the cumulative value stored in the TPC cumulative value storage unit 105 (S103). For example, the post-TPC-control-initialization correction interval calculation unit 107 may treat an interval predetermined based on the cumulative value stored in the TPC cumulative value storage unit 105 as the correction interval during which a TPC command is transmitted, as described above. Alternatively, the post-TPC-control-initialization correction interval calculation unit 107 may calculate the correction interval during which a TPC command is transmitted, by dividing the cumulative value stored in the TPC cumulative value storage unit 105 by the increment or decrement value of the TPC command, as described above. Then, the TPC control initialization processing unit 103 sets uplink transmission power to a predetermined initial value (S105).

The check unit 109 checks whether the current subframe is within the correction interval calculated by the post-TPC-control-initialization correction interval calculation unit 107 (S107). When the current frame is within the correction interval (S107: YES), the switch unit 111 uses the post-TPC-control-initialization TPC command calculation unit 113 to determine a TPC command.

When the cumulative value stored in the TPC cumulative value storage unit 105 is positive (S109: YES), the post-TPC-control-initialization TPC command calculation unit 113 determines a TPC command which increments transmission power. A value of the TPC command may be determined as a value which increments transmission power at maximum. The control channel transmission unit 127 transmits the determined TPC command to the mobile station (S111).

On the other hand, when the cumulative value stored in the TPC cumulative value storage unit 105 is negative (S109: NO), the post-TPC-control-initialization TPC command calculation unit 113 determines a TPC command which decrements transmission power. A value of the TPC command may be determined as a value which decrements transmission power at maximum. The control channel transmission unit 127 transmits the determined TPC command to the mobile station (S113).

During the correction interval, the TPC command is continuously or frequently transmitted to the mobile station.

When the TPC control initialization is not triggered (S101: NO) or when the current subframe is not within the correction interval calculated by the post-TPC-control-initialization correction interval calculation unit 107 (S107: NO), the switch unit 111 uses the TPC command calculation unit 117 to determine a TPC command. The TPC command calculation unit 117 determines a TPC command based on the comparison between received quality and target received quality and the control channel transmission unit 127 transmits the determined TPC command to the mobile station (S115).

FIG. 7 shows a flowchart of a method of controlling transmission power in accordance with an embodiment of the present invention (in the case where a non-communication interval is equal to or longer than a predetermined threshold).

The non-communication interval monitor unit 129 monitors a non-communication interval during which downlink data or uplink data are not transmitted (S151). When the non-communication interval is shorter than a predetermined threshold (S153: NO), the non-communication interval monitor unit 129 continues to monitor the non-communication interval (S151).

When the non-communication interval is equal to or longer than the predetermined threshold (S153: YES), the control channel transmission unit 127 transmits an UL scheduling grant or DL scheduling information (S155). With the reception of the UL scheduling grant, the mobile station determines transmission power according to the TPC command and transmits the PUSCH without significant data. Alternatively, the base station transmits the PDSCH without significant data along with the DL scheduling information, and the mobile station transmits ACK/NACK on the PUCCH according to the TPC command.

When the base Station receives the PUSCH or the PUCCH, the switch unit 111 uses the TPC command calculation unit 117 to determine a TPC command. The TPC command calculation unit 117 measures received quality (S157) and determines a TPC command based on the comparison between the received quality and target received quality. The control channel transmission unit 127 transmits the determined TPC command to the mobile station (S159).

Configuration of Base Station in Accordance with Modified Embodiment

In the embodiment described with reference to FIGS. 4-7, the correction interval during which a TPC command is transmitted is calculated before the TPC command is transmitted. A modified embodiment is described below in which the correction interval is not calculated before the TPC command is transmitted.

FIG. 8 shows a block diagram of a base station in accordance with a modified embodiment of the present invention. The base station includes a TPC control initialization determination unit 201, a TPC control initialization processing unit 203, a TPC cumulative value storage unit 205, an arithmetic computation unit 209, a switch unit 211, a post-TPC-control-initialization TPC command calculation unit 213, a TPC command calculation unit 217, a control channel transmission unit 227, and a non-communication interval monitor unit 229.

The TPC control initialization determination unit 201, the TPC control initialization processing unit 203, the TPC cumulative value storage unit 205, the TPC command calculation unit 217, the control channel transmission unit 227, and the non-communication interval monitor unit 229 are the same as the TPC control initialization determination unit 101, the TPC control initialization processing unit 103, the TPC cumulative value storage unit 105, the TPC command calculation unit 117, the control channel transmission unit 127, and the non-communication interval monitor unit 129 shown in FIG. 4, respectively. In addition, a target received SIR calculation unit 219, a received SIR measurement unit 221, a comparison unit 223, and a TPC command determination unit 225 included in the TPC command calculation unit 217 are the same as the target received SIR calculation unit 119, the received SIR measurement unit 121, the comparison unit 123, and the TPC command determination unit 125 shown in FIG. 4. Thus, different functional units are described below.

The arithmetic computation unit 209 calculates a difference (A−B) between the cumulative value A of TPC commands stored in the TPC cumulative value storage unit 205 and the cumulative value B of TPC commands after the TPC control initialization. The cumulative value of TPC commands after the TPC control initialization is stored in a post-initialization TPC cumulative value storage unit 216 as described below. The arithmetic computation unit 209 may multiply the cumulative value A of TPC commands stored in the TPC cumulative value storage unit 205 by any coefficient or add the cumulative value A to any coefficient to calculate the difference. For example, the arithmetic computation unit 209 may calculate (α×A+β)−B instead of calculating (A−B). While the arithmetic computation unit 209 calculates (A−B) in the following description, the present embodiment can be also applicable to the case where the arithmetic computation unit 209 calculates (α×A+β)−B.

The switch unit 211 determines whether the post-TPC-control-initialization TPC command calculation unit 213 or the TPC command calculation unit 217 is used to determine a TPC command. When the difference (A−B) calculated by the arithmetic computation unit 209 has never been equal to zero, the switch unit 211 uses the post-TPC-control-initialization TPC command calculation unit 213 to continuously or frequently transmit a TPC command to the mobile station. On the other hand, when once the difference (A−B) calculated by the arithmetic computation unit 209 is equal to zero, the switch unit 211 uses the TPC command calculation unit 217 to determine a TPC command based on received quality of the PUSCH or the PUCCH as usual.

The post-TPC-control-initialization TPC command calculation unit 213 calculates a value of the TPC command based on the difference (A−B) calculated by the arithmetic computation unit 209. The post-TPC-control-initialization TPC command calculation unit 213 includes a TPC command determination unit 215 and a post-initialization TPC cumulative value storage unit 216.

The TPC command determination unit 215 determines a TPC command based on the difference (A−B) determined by the arithmetic computation unit 209. For example, when the DCI format 0/3 or the DCI format 1A/1B/1D/1/2A/2B/2/3 is used, the TPC command determination unit 215 determines a TPC command with 3 dB when (A−B)>=3, determines a TPC command with 1 dB when 2>=(A−B)>=1, determines a TPC command with 0 dB when (A−B)=0 (or determines not to transmit a TPC command), and determines a TPC command with −1 dB when (A−B)<=−1. For example, when the DCI format 3A is used, the TPC command determination unit 215 determines a TPC command with 1 dB when (A−B)>=1, and determines a TPC command with −1 dB when (A−B)<=−1. Thus, the TPC command determination unit 215 determines a TPC command until (A−B)=0.

The post-initialization TPC cumulative value storage unit 216 stores a cumulative value of TPC commands determined by the TPC command determination unit 215 after uplink transmission power is initialized.

Operation of Base Station in Accordance with Modified Embodiment

FIG. 9 shows a flowchart of a method of controlling transmission power in accordance with a modified embodiment of the present invention (in the case of TPC control initialization).

The TPC control initialization determination unit 201 detects whether TPC control initialization is intentionally trigged under the sequence of reconfiguration or the like in the base station. Alternatively, the TPC control initialization determination unit 201 detects whether TPC control initialization is triggered by initiation of random access in the mobile station (S201).

When the TPC control initialization is triggered (S201: YES), the TPC cumulative value storage unit 205 stores a cumulative value of TPC commands transmitted to the mobile station (S203). Then, the TPC control initialization processing unit 203 sets uplink transmission power to a predetermined initial value (S205).

The arithmetic computation unit 209 calculates a difference (A−B) between the cumulative value A of TPC commands stored in the TPC cumulative value storage unit 205 and the cumulative value B of TPC commands after the TPC control initialization. It should be noted that the cumulative value B of TPC commands is equal to zero immediately after initialization.

When the difference (A−B) calculated by the arithmetic computation unit 209 has never been equal to zero (S207: NO), the switch unit 211 uses the post-TPC-control-initialization TPC command calculation unit 213 to continuously or frequently transmit a TPC command to the mobile station.

For example, when the DCI format 0/3 or the DCI format 1A/1B/1D/1/2A/2B/2/3 is used, the post-TPC-control-initialization TPC command calculation unit 213 determines a TPC command with 3 dB when (A−B)>=3, determines a TPC command with 1 dB when 2>=(A−B)>=1, determines a TPC command with 0 dB when (A−B)=0 (or determines not to transmit a TPC command), and determines a TPC command with −1 dB when (A−B)<=−1. For example, when the DCI format 3A is used, the post-TPC-control-initialization TPC command calculation unit 213 determines a TPC command with 1 dB when (A−B)>=1, and determines a TPC command with −1 dB when (A−B)<=−1. The control channel transmission unit 227 transmits the determined TPC command to the mobile station (S209).

Similarly, the TPC command is continuously or frequently transmitted to the mobile station until (A−B) is equal to zero.

When the TPC control initialization is not triggered (S201: NO) or when once the difference (A−B) calculated by the arithmetic computation unit 209 is equal to zero (S207: YES), the switch unit 211 uses the TPC command calculation unit 217 to determine a TPC command. The TPC command calculation unit 217 determines a TPC command based on the comparison between received quality and target received quality and the control channel transmission unit 227 transmits the determined TPC command to the mobile station (S211).

When a non-communication interval is equal to or longer than a predetermined threshold in this modified embodiment, the base station performs the operations as described with reference to FIG. 7.

For convenience of explanation, the base station according to the embodiments of the present invention has been described with reference to functional block diagrams, but the base station may be implemented in hardware, software, or combinations thereof. In addition, two or more functional elements may be combined as appropriate.

For convenience of explanation, the method according to the embodiments of the present invention has been described with reference to flowcharts, but the method may be carried out in a different order from the order shown in the embodiments.

Effects of Embodiments

According to an embodiment of the present invention, a base station can control uplink transmission power, even if there are no uplink transmission data to be transmitted from a mobile station or no downlink transmission data to be transmitted to the mobile station, thereby improving communication quality.

When uplink transmission power is initialized, a TPC command is continuously or frequently transmitted based on a cumulative value of TPC commands immediately before the initialization, which makes it possible to quickly follow the fluctuation of the propagation condition. As a result, it is possible to improve uplink communication quality or to reduce interference power at another mobile station.

In addition, a TPC command can be transmitted during a non-communication interval, even if there are no uplink transmission data or no downlink transmission data, which makes it possible to quickly follow the fluctuation of the propagation condition. As a result, it is possible to improve uplink communication quality or to reduce interference power at another mobile station.

By using a TPC command which increments or decrements transmission power at maximum during the correction interval during which a TPC command is continuously or frequently transmitted, it is possible to more quickly follow the fluctuation of the propagation condition.

Furthermore, according to the modified embodiment as described above, it is possible to sensitively control transmission power when a plurality of increment or decrement values are possible for a TPC command.

FIG. 10 shows a comparison between uplink transmission power in an LTE mobile communication system and uplink transmission power in a mobile station in accordance with an embodiment of the present invention.

Figure 3:
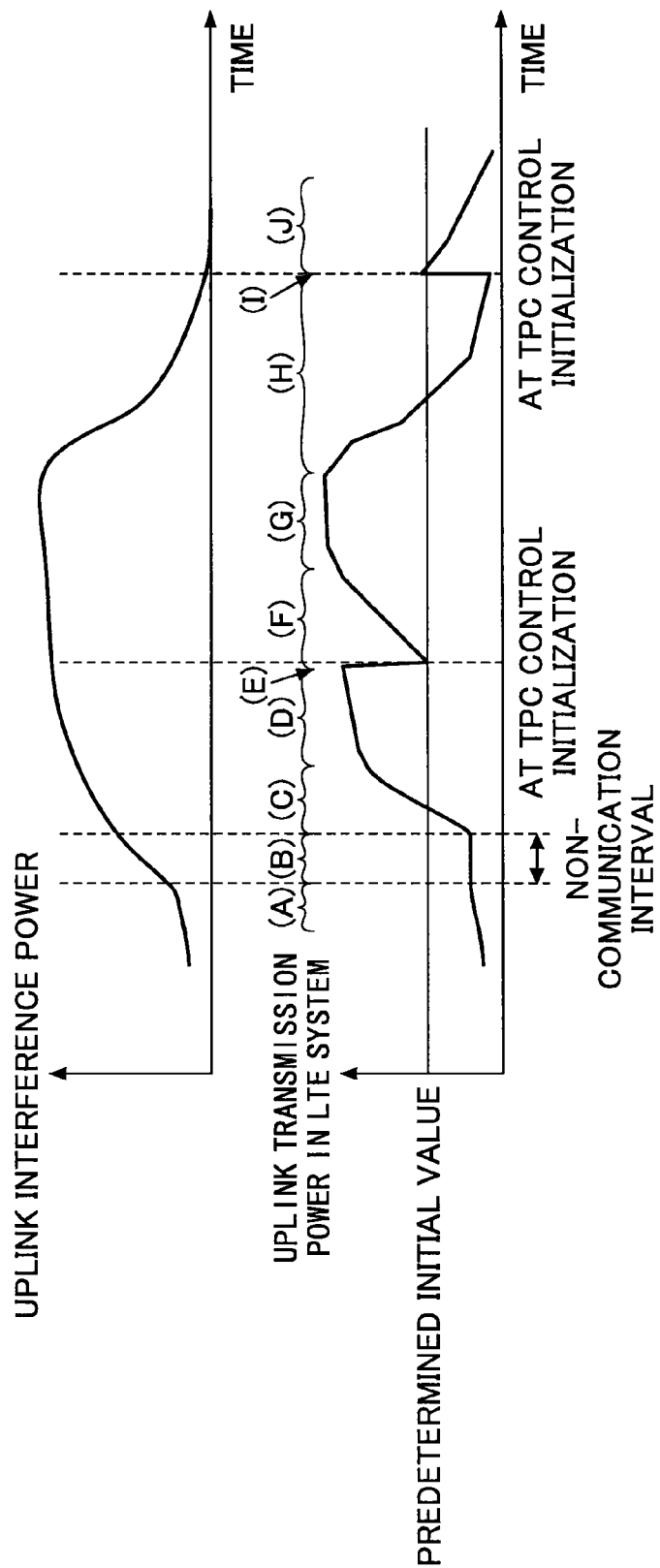
FIG. 3 shows a diagram of uplink transmission power in an LTE communication system.

In an LTE mobile communication system, when a non-communication interval occurs as shown during the period (B) in FIG. 3, it takes time to follow the fluctuation of the propagation condition as shown during the period (C). According to an embodiment of the present invention, a TPC command is transmitted when the non-communication interval is equal to or longer than a predetermined threshold, which makes it possible to quickly follow the fluctuation of the propagation condition.

In addition, in an LTE mobile communication system, when uplink transmission power is initialized as shown at the point (E) or (I) in FIG. 3, it takes time to follow the fluctuation of the propagation condition, which causes degradation of uplink communication quality or an excessive amount of interference power at another mobile station. According to an embodiment of the present invention, a TPC command is continuously or frequently transmitted based on the cumulative value of TPC commands immediately before the initialization. Thus, it is possible to quickly follow the fluctuation of the propagation condition even if transmission power is initialized.

While the base station and the method of controlling uplink transmission power even if there are no uplink transmission data to be transmitted from a mobile station or no downlink transmission data to be transmitted to the mobile station are described above, the present invention is not limited to the these embodiments, and variations, modifications, alterations, and substitutions can be made by those skilled in the art without deviating from the spirit of the present invention.

The present international application is based on and claims the benefit of priority of Japanese Patent Application No. 2012-189501 filed on Aug. 30, 2012, the entire contents of which are hereby incorporated by reference.

DESCRIPTION OF NOTATIONS

101 TPC control initialization determination unit
103 TPC control initialization processing unit
105 TPC cumulative value storage unit
107 post-TPC-control-initialization correction interval calculation unit
109 check unit
111 switch unit
113 post-TPC-control-initialization TPC command calculation unit
115 TPC command determination unit
117 TPC command calculation unit
119 target received SIR calculation unit
121 received SIR measurement unit
123 comparison unit
125 TPC command determination unit
127 control channel transmission unit
129 non-communication interval monitor unit

The invention claimed is:

1. A base station, comprising:
a cumulative value storage unit configured to store a cumulative value of transmission power control commands transmitted to a mobile station;
a transmission power control command determination unit configured to determine a transmission power control command based on the cumulative value stored in the cumulative value storage unit, when uplink transmission power is initialized; and
a control channel transmission unit configured to transmit the transmission power control command determined by the transmission power control command determination unit to the mobile station on a control channel.

2. The base station as claimed in claim 1, further comprising:
an interval calculation unit configured to calculate an interval during which the transmission power control command is transmitted based on the cumulative value stored in the cumulative value storage unit, when the uplink transmission power is initialized.

3. The base station as claimed in claim 2,
wherein the transmission power control command determination unit calculates, as a value of the transmission power control command, a value which increments transmission power at maximum when the cumulative value stored in the cumulative value storage unit is positive, and calculates, as the value of the transmission power control command, a value which decrements transmission power at maximum when the cumulative value stored in the cumulative value storage unit is negative, and
the interval calculation unit calculates the interval during which the transmission power control command is transmitted, by dividing the cumulative value stored in the cumulative value storage unit by the increment or decrement value of transmission power calculated by the transmission power control command determination unit.

4. The base station as claimed in claim 2,
wherein the interval calculation unit calculates the interval during which the transmission power control command is transmitted based on an interval predetermined according to the cumulative value stored in the cumulative value storage unit.

5. The base station as claimed in claim 1, further comprising:
- a post-initialization cumulative value storage unit configured to store a cumulative value of transmission power control commands determined by the transmission power control command determination unit,
- wherein the transmission power control command determination unit determines the transmission power control command based on the cumulative value of transmission power control commands stored in the cumulative value storage unit and the cumulative value of transmission power control commands stored in the post-initialization cumulative value storage unit.

6. The base station as claimed in claim 1, further comprising:
- a non-communication interval monitor unit configured to monitor a non-communication interval during which downlink data or uplink data are not transmitted,
- wherein the control channel transmission unit transmits control information for causing the mobile station to transmit data or control information, when the non-communication interval monitored by the non-communication interval monitor unit is equal to or longer than a predetermined threshold.

7. A base station, comprising:
- a non-communication interval monitor unit configured to monitor a non-communication interval during which downlink data or uplink data are not transmitted;
- a control channel transmission unit configured to transmit control information for causing a mobile station to transmit data or control information, when the non-communication interval monitored by the non-communication interval monitor unit is equal to or longer than a predetermined threshold; and
- a transmission power control command determination unit configured to determine a transmission power control command based on received quality of data or control information received from the mobile station.

8. A method of controlling uplink transmission power in a base station, comprising the steps of:
- storing a cumulative value of transmission power control commands transmitted to a mobile station;
- determining a transmission power control command based on the stored cumulative value, when uplink transmission power is initialized; and
- transmitting the determined transmission power control command to the mobile station on a control channel.

9. A method of controlling uplink transmission power in a base station, comprising the steps of:
- monitoring a non-communication interval during which downlink data or uplink data are not transmitted;
- transmitting control information for causing a mobile station to transmit data or control information, when the monitored non-communication interval is equal to or longer than a predetermined threshold; and
- determining a transmission power control command based on received quality of data or control information received from the mobile station.

\* \* \* \* \*